G. MEDING.
Roller and Pulverizer.
No. 215,954. Patented May 27, 1879.
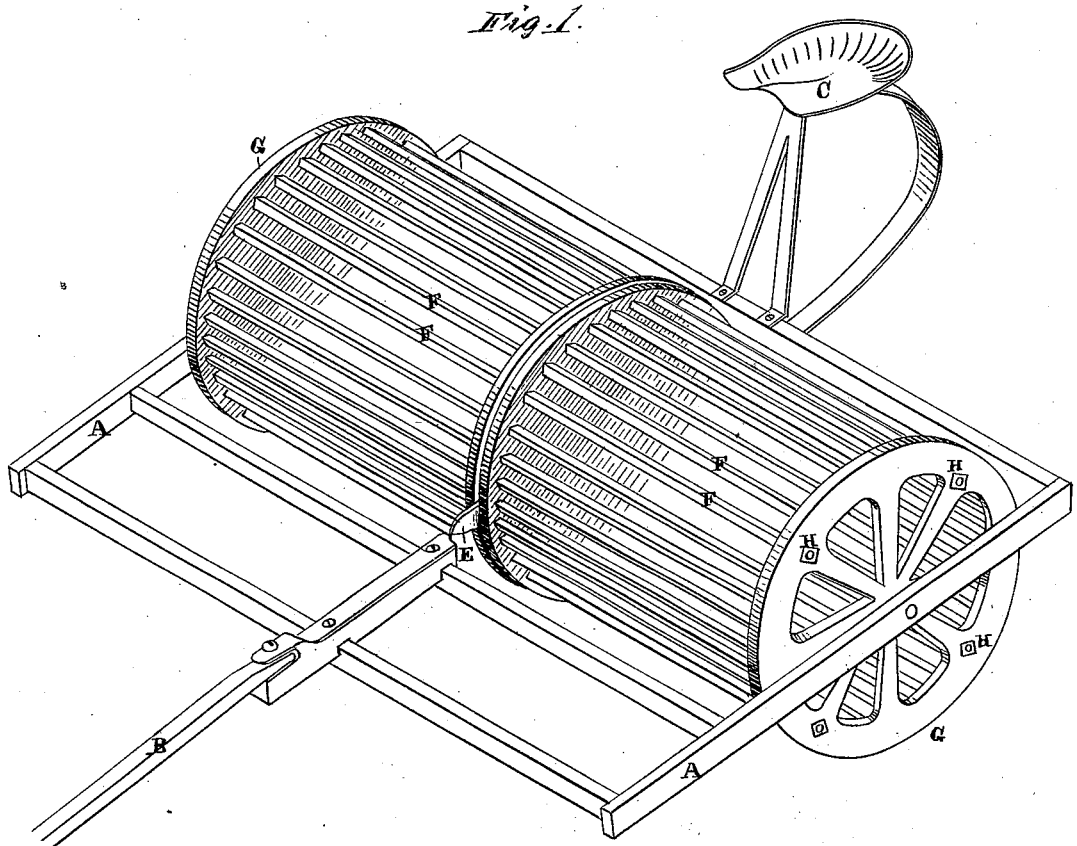
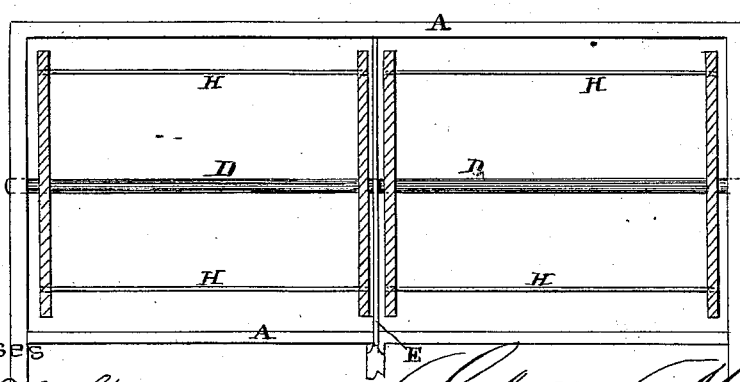

UNITED STATES PATENT OFFICE.

GEORGE MEDING, OF SAN FRANCISCO, CALIFORNIA.

IMPROVEMENT IN ROLLERS AND PULVERIZERS.

Specification forming part of Letters Patent No. 215,954, dated May 27, 1879; application filed January 31, 1879.

*To all whom it may concern:*

Be it known that I, GEORGE MEDING, of the city and county of San Francisco, and State of California, have invented a Roller and Pulverizer; and I hereby declare the following to be a full, clear, and exact description thereof.

My invention relates to that class of pulverizers or clod-crushers which are rolled over the ground, and by that means break up the lumps and leave the soil in proper condition for sowing seed.

My improvements consist in making the rollers of heads provided with an intervening series of removable four-sided bars, placed so that the edges of said bars strike the ground and act more effectually on the lumps than a flat surface does. These bars may be removed at will, or turned so that fresh edges are presented when the others are worn. The bars may be turned four times. The small lumps may pass through the interstices of the bars, and by being rolled over and over on the sharp edges inside the roller are pulverized, and the dirt will then fall through onto the ground, as is more fully described in the accompanying drawings, in which—

Figure 1 is a perspective view of my device. Fig. 2 is a skeleton section.

A represents the frame of my roller and pulverizer, having a pole, B, to which the horses are attached in front, and at the rear a seat, C, for the driver. In a suitable position across the frame is the axle D, said axle being fixed to the frame and not being intended to revolve. A bearing for the center of this axle is given by the bar E, which crosses from front to rear in the center, as shown, between the rollers.

On the axle D are mounted two rollers, each moving independently of the other, but on the same shaft or axle. These rollers are formed by four-sided bars F, secured in a circle to the edges of the wheels G. The bars are so placed that their edges are outward and strike the ground so as to more effectually cut up the clods or lumps. The pairs of wheels on each side of the center bar are joined together by rods H, inside the circle of bars, the rods H being set up by screws at their ends, as shown, so as to keep the bars F in position.

By unscrewing the rods H the wheels may be separated, so that the bars F may be turned and bring new edges outside. When, however, the rods H are screwed up, the bars F cannot turn, and their sharp edges are kept in proper position.

The bars are secured in position in the wheels by square countersunk holes being made in the wheels and the rods inserted. As these holes do not reach through the wheels, the bars cannot move endwise when the rods are screwed up, and the shape of the holes in the wheels is such that they cannot rotate. When, however, it is desired to remove the bars, by unscrewing the rods holding the wheels together, said pairs of wheels can be separated far enough to let the ends of the bars come out of the wheels, when fresh edges can be turned outward.

Rollers made in this manner are much more effective as clod crushers or pulverizers than those of ordinary construction. The sharp edges of the bars cut or break the clods without pressing them into the ground. Such pieces or lumps as pass through the interstices between the bars are rolled over and over until fine enough to pass out again.

When the edges of the bars become dull they can be turned, so that fresh edges can be presented. In this way each bar can be turned four times before needing renewal.

Rollers of this kind can be made comparatively light, and be easier on the draft-animals than the heavy plank rollers, while at the same time, from their peculiar construction, they are very much more effective than those of ordinary construction. Each pair of wheels for each roller revolves independently on the shaft, so as to facilitate turning. The wheels may be made open at the sides, as shown, for lightness and facility of construction.

In order to give my roller the best possible effect, and make the edges of the bars last as long as possible, I prefer to form them with concave sides, as shown in the drawings. This produces a thinner and more cutting and effective edge; and these bars may be rolled as cheaply as any other form by having rolls provided for the purpose.

Having thus described my invention, what I claim as new, and desire to secure by Letters Patent, is—

In a rotating harrow or pulverizer, the disks G, in combination with a series of removable bars, F, made square in cross-section, and arranged with their diagonal dimension radial to the center of the disks, as set forth.

In witness whereof I have hereunto set my hand.

GEORGE MEDING.

Witnesses:
GEO. H. STRONG,
FRANK A. BROOKS.